United States Patent

Siroki

Patent Number: 5,757,538
Date of Patent: May 26, 1998

[54] OPTICAL ISOLATOR

[75] Inventor: Kenichi Siroki, Sendai, Japan

[73] Assignee: Tokin Corporation, Miyagi, Japan

[21] Appl. No.: 532,636
[22] PCT Filed: Feb. 16, 1995
[86] PCT No.: PCT/JP95/00214
    § 371 Date: Oct. 2, 1995
    § 102(e) Date: Oct. 2, 1995
[51] Int. Cl.$^6$ .................................... G02F 1/09
[52] U.S. Cl. ......................... 359/282; 359/281; 359/484
[58] Field of Search ......................... 359/280, 281, 359/282, 283, 324, 484, 566, 569, 300, 285; 252/584

[56] References Cited

U.S. PATENT DOCUMENTS

| | | | |
|---|---|---|---|
| 3,663,087 | 5/1972 | Guillet et al. | 359/283 |
| 4,728,178 | 3/1988 | Gualtieri et al. | 359/282 |
| 4,756,607 | 7/1988 | Watanabe et al. | 359/282 |
| 4,856,878 | 8/1989 | Wilson et al. | 359/283 |
| 4,896,103 | 1/1990 | Shimanuki et al. | 359/281 |
| 5,305,137 | 4/1994 | Ohkawara | 359/281 |
| 5,315,431 | 5/1994 | Masuda et al. | 359/281 |
| 5,341,235 | 8/1994 | Watanabe et al. | 359/281 |
| 5,452,122 | 9/1995 | Tsuneda et al. | 359/281 |
| 5,535,046 | 7/1996 | Shirai et al. | 359/281 |

FOREIGN PATENT DOCUMENTS

| | | |
|---|---|---|
| 58-42003 | 3/1983 | Japan . |
| 3-188412 | 8/1991 | Japan . |

*Primary Examiner*—Loha Ben
*Attorney, Agent, or Firm*—Frishauf, Holtz, Goodman, Langer & Chick

[57] ABSTRACT

An optical isolator, which is small in size, light in weight and simple in manufacture, includes a Faraday element (1). The optical isolator also includes polarization films (2a, 2b) formed on a light incident surface and light emitting surface of the Faraday element. The Faraday element rotates a polarization plane of incident light by an angle approximately equal to 45°. The optical isolator also includes a magnetic field applying mechanism (3) for applying a magnetic field to the Faraday element. Each of the polarization films (2a, 2b) includes a thin film made of a conductive material. The polarization films form unidirectional grating with an interval not greater than one tenth of the wavelength of light. One of the polarization films (2b) formed on the light emitting surface makes, in a plane perpendicular to an optical axis, an angle with respect to the other polarization film (2a) formed on the light incident surface, the angle which is approximately equal to 45° in a direction similar to that of rotation of the polarization plane by the Faraday element (1).

8 Claims, 2 Drawing Sheets

OPTICAL ISOLATOR

TECHNICAL FIELD

This invention relates to an optical isolator for use in optical communication, broadcast wave transmission using light, measurement by light, and so on to prevent a light wave emitted from a laser as a light source from returning to the light source due to various causes.

BACKGROUND ART

FIG. 1 shows a structure of an optical isolator in the prior art which basically comprises a Faraday element 1, a first polarizer 4a, a second polarizer 4b, and a permanent magnet 3. The Faraday element 1 used herein is a rare earth-bismuth-iron-garnet single crystal thick film prepared by the LPE (liquid phase epitaxial) method. The Faraday element 1 is practically used, for instance, in optical communication. The polarizers 2a and 2b (which are collectively referred to as 2 alone) used herein are polarizing prisms, polarizing glass plates, and the like. In addition, the permanent magnet 3, is made of a ferrite magnet, a rare-earth metal, or the like, which has a cylindrical shape and is magnetized in an axial direction.

In order to ensure desired characteristics of the optical isolator, accurate positioning of the optical isolator in a plane perpendicular to an optical axis is necessary such that an angles is formed between the first polarizer 4a and the Faraday element 1 and another angles formed between the first and the second polarizers 4a and 4b. Accordingly, in production, it is extremely important to fix, with high precision, these components by the use of an organic adhesive, an inorganic adhesive, or metal such as solder.

The polarizer may be made of metallic thin films which have recently been known to have a polarization characteristic. The metallic thin films are formed so as to have narrow stripe shapes in a substrate, for example, glass and spaced from each other by an interval not greater than one tenth of the wavelength of light. Such a metallic thin film is also used as the polarizer in the optical isolator. Even in this case, however, it is inevitable to carry out a production process similar to that mentioned above.

As mentioned above, the prior art optical isolator is produced by mechanically fixing the individual components or by use of an adhesive. During production, the locational and angular positioning must be established with high precision as mentioned above. Therefore, it is not easy to maintain good quality at a low cost. Additionally, with a miniaturization of the apparatus on which the optical isolator is mounted, the optical isolator is required to be of a smaller size which is hardly achieved by the conventional technique of the prior art.

It is therefore an object of the present invention to solve the above-mentioned problems and to provide an optical isolator which is small in size, light in weight, and simple to produce.

SUMMARY OF THE INVENTION

In accordance with one form of the present invention, an optical isolator includes a Faraday element having polarization films formed on a light incident surface and a light outgoing surface thereof and which is for rotating a polarization plane of incident light by an angle approximately equal to 45°, and a magnetic field applying mechanism for applying a magnetic field to the Faraday element. Each of the polarization films includes a thin film made of a conductive material, and the polarization films are formed on the light incident surface and the light outgoing surface of the Faraday element, respectively, in the form of a unidirectional grating with an interval not greater than one tenth of the wavelength of light. One of the polarization films formed on the light outgoing surface forms, in a plane perpendicular to an optical axis, an angle with respect to the other polarization film formed on the light incident surface, wherein the angle is approximately equal to 45° in a direction similar to that of rotation of the polarization plane by the Faraday element.

A preferred form of the optical isolator, as well as other embodiments, objects, features and advantages of this invention, will be apparent from the following detailed description of illustrative embodiments thereof, which is to be read in connection with the accompanying drawings.

DETAILED DESCRIPTION OF THE PREFERRED EMBODIMENT

In order to describe the present invention in detail, description will be made in accordance with drawings attached hereto.

Figure 1:
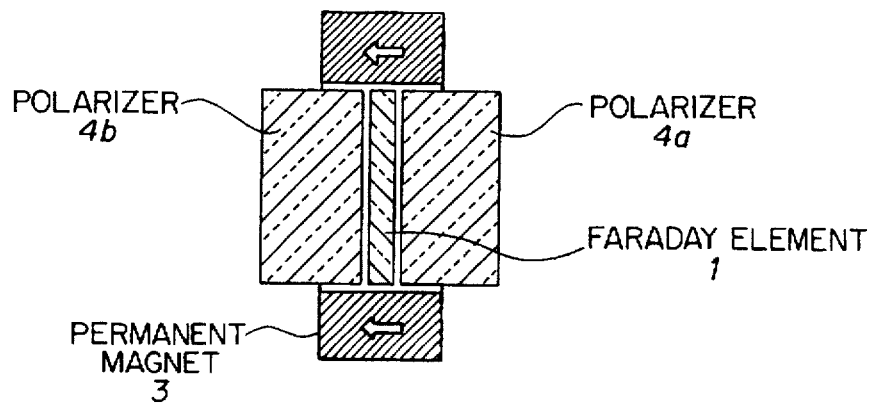
FIG. 1 is a sectional view illustrating a structure of an optical isolator of the prior art.
Figure 2:
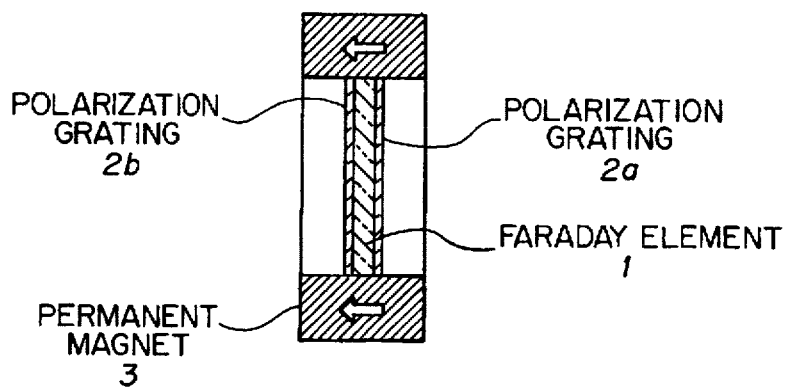
FIG. 2 is a sectional view illustrating a structure of an optical isolator according to the present invention.

FIG. 2 is a sectional view showing an optical isolator according to an embodiment of the present invention. Reference numeral 1 denotes a Faraday element which is provided with polarization gratings 2 on both surfaces thereof. Reference numeral 3 represents a permanent magnet.

The Faraday element 1 is preferably made of a terbium-bismuth-iron-garnet single crystal $((TbBi)_3Fe_5O_{12})$ thick film (which is hereinafter called a garnet film) having a thickness of 0.45 mm and a diameter of 3 mm.

In this embodiment, silver thin films (having a film thickness of 500 Å) are formed on a light incident surface of the garnet film to form a unidirectional grating having a bar width of 100 Å and an interval of 1000 Å so as to provide a polarization grating 2a of a light incident side. Likewise, a polarization grating 2b is formed on a rear surface (an emitting surface) of the garnet film and at an angle of 45° relatively rotated in a counterclockwise direction as viewed from the light incidence side. Thereafter, the garnet film is worked into a chip having a diameter of 3 mm which is used as the Faraday element 1. The Faraday element 1 is then mounted and fixed within a permanent magnet 3 preferably having a cylindrical shape.

Figure 3:
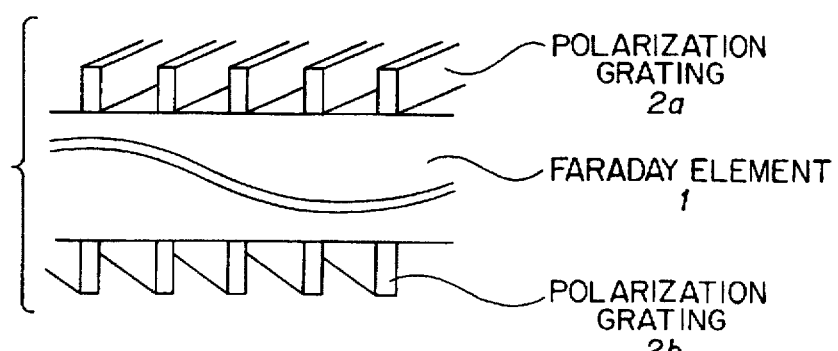
FIG. 3 is an enlarged schematic view of a Faraday element and polarization gratings formed on surfaces thereof.

FIG. 3 is an enlarged sectional view showing the Faraday element 1 with the above-mentioned polarization gratings 2a and 2b formed on the front and the rear surfaces thereof, respectively.

With respect to an incident light beam having a wavelength of 1.55 μm, the optical isolator according to this embodiment exhibits a polarization plane rotation angle of 45°, a light transmission loss of 0.5 dB in a forward direction, and a backward loss of 30 dB. In other embodiments having polarization gratings of the similar thin films, properties similar to the foregoing were also obtained. Moreover, it is also possible to obtain excellent results in the case where the metallic thin films are formed at grating intervals smaller than 1000 Å.

Figure 4A:
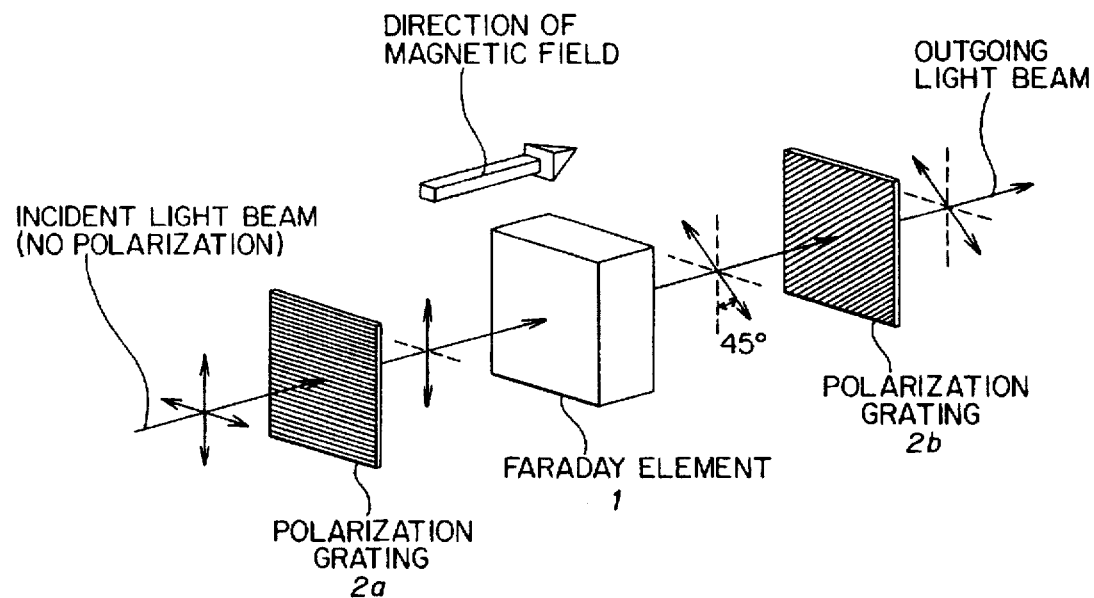
FIG. 4A is a diagram used for describing a function of the optical isolator.
Figure 4B:
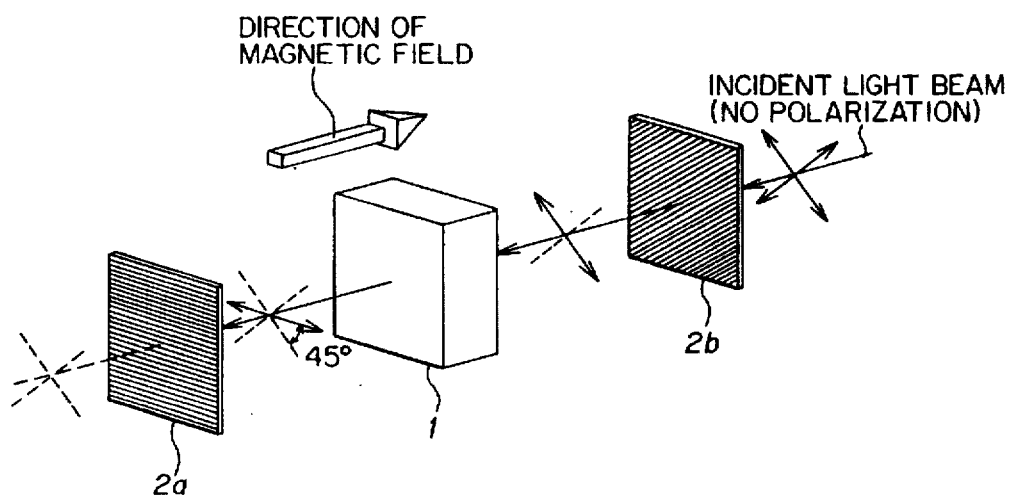
FIG. 4B is a diagram used for describing a function of the optical isolator.

FIGS. 4A and 4B are views is a view schematically showing a function of the optical isolator according to the present invention. Referring now to FIG. 4(A), when the incident light beam (no polarization) is transmitted through the first polarization grating 2a, a lateral oscillation component is absorbed by the metallic grating parallel thereto. As a consequence, a longitudinal oscillation component alone is incident to the Faraday element 1. Being applied with a magnetic field, the Faraday element 1 rotates a polarization plane of the incident component by an angle of 45° to produce an outgoing light beam, of which a component passes through the second polarization grating 2b as the emitting light beam of the optical isolator. Next, referring to FIG. 4B, consideration will be made with regard to another incident light beam (no polarization) in a reverse direction. In this case, the Faraday element 1 rotates a polarization plane of a polarization component transmitted through the second polarization grating 2b by an angle of 45°. The rotated light is incident to the first polarization grating 2a but is inhibited from passing therethrough.

As mentioned above, in the optical isolator according to the present invention, the thin polarization gratings are directly attached to the Faraday element as polarization elements arranged on both surfaces thereof. With this structure, it is possible to save a space for two polarization elements of a bulk type. This achieves a further reduction in size and weight. Furthermore, according to the present invention, the polarization films are formed on the light incident surface and the light outgoing surface of the Faraday element. Accordingly, it is not necessary in a production process to combine the individual components so precisely as in the prior art. Thus, it is possible to provide the optical isolator having a constant quality at a low cost.

An optical isolator according to this invention is applicable to, among other things, optical communication, broadcast wave transmission using light, and measurement by light. In addition, it is also possible to use the optical isolator in an optical pickup of an optical disk and so on. The optical isolator is used in various instruments in order to prevent a light wave emitted from a laser as a light source from returning to the light source due to various causes.

I claim:
1. An optical isolator comprising:
   a Faraday element having a light incident surface and a light emitting surface,
   first and second polarization films respectively formed on the light incident surface and the light emitting surface of said Faraday element, said polarization films rotating a polarization plane of an incident light beam by an angle approximately equal to 45°, and
   a magnetic field applying mechanism for applying a magnetic field to said Faraday element,
   wherein each of said first and second polarization films comprises a thin film made of a conductive material, said first and second polarization films being in the form of a unidirectional grating having an interval not greater than one tenth of the wavelength of light, and
   wherein one of said first and second polarization films which is formed on said light emitting surface provides, in a plane substantially perpendicular to an optical axis, an angle with respect to another of said first and second polarization film formed on said light incident surface, said angle being approximately equal to 45° in a direction similar to that of rotation of said polarization plane by said Faraday element.

2. The optical isolator as defined by claim 1 wherein the Faraday element comprises a terbium-bismuth-iron-garnet single crystal film.

3. The optical isolator as defined by claim 2 wherein the terbium-bismuth-iron-garnet single crystal film has a thickness of approximately 0.45 mm and a diameter of approximately 3 mm.

4. The optical isolator as defined by claim 1 wherein the first and second polarization films comprise a unidirectional grating.

5. The optical isolator as defined by claim 4 wherein the unidirectional grating comprises a bar width of approximately 100 Å and an interval of 1000 Å.

6. The optical isolator as defined by claim 1 wherein the first and second polarization films comprise a silver film.

7. The optical isolator as defined by claim 6 wherein the silver film has a thickness of approximately 500 Å.

8. The optical isolator as defined by claim 1 wherein the magnetic field applying mechanism comprises a permanent magnet.

\* \* \* \* \*